United States Patent
Sakasegawa et al.

[19]

[11] Patent Number: 6,023,130
[45] Date of Patent: *Feb. 8, 2000

[54] PLASMA DISPLAY SUBSTRATE AND A PRODUCTION METHOD THEREOF

[75] Inventors: Kiyohiro Sakasegawa; Koji Hamada; Toshikazu Kishino, all of Kokubu; Hisamitsu Sakai, Kyoto; Masashi Kato, Kokubu, all of Japan

[73] Assignee: Kyocera Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/714,837

[22] Filed: Sep. 6, 1996

[30] Foreign Application Priority Data

| Sep. 6, 1995 | [JP] | Japan | 7-229393 |
| Nov. 22, 1995 | [JP] | Japan | 7-304688 |
| Dec. 27, 1995 | [JP] | Japan | 7-340124 |
| Mar. 26, 1996 | [JP] | Japan | 8-69999 |
| Mar. 29, 1996 | [JP] | Japan | 8-77849 |
| Jun. 28, 1996 | [JP] | Japan | 8-170495 |

[51] Int. Cl.$^7$ .................................................. H01J 61/00
[52] U.S. Cl. ............................................ 313/582; 313/584
[58] Field of Search ..................................... 313/582, 584

[56] References Cited

U.S. PATENT DOCUMENTS 3,942,061   3/1976   van Esdonk et al. ................. 313/584
5,144,200   9/1992   Kim ..................................... 313/584

FOREIGN PATENT DOCUMENTS

| 1137534 | 11/1987 | Japan . |
| 01213936 | 8/1989 | Japan . |
| 03254857 | 11/1991 | Japan . |
| 04259728 | 9/1992 | Japan . |

*Primary Examiner*—Ashok Patel
*Attorney, Agent, or Firm*—Loeb & Loeb LLP

[57] ABSTRACT

A plasma display substrate comprising a rear plate and a plurality of partitions for forming display cells between every two adjacent partitions on one of the surfaces of the rear plate, wherein the partitions are molded independently of the rear plate with the mixture of ceramic or glass powder and a binder inclusive of organic additives and solvents are formed in a desired shape and a desired disposition on one of the surfaces of the rear plate made of ceramics or glass, and integrally joined to the rear plate. According to the substrate, the display cells have improved dimensional accuracy, particularly, the partitions having highly accurate flat side surfaces with no deformation and having a predetermined height can be formed easily. This disclosure also provides a method of producing the same.

13 Claims, 8 Drawing Sheets

PLASMA DISPLAY SUBSTRATE AND A PRODUCTION METHOD THEREOF

FIELD OF THE INVENTION

The present invention relates to a plasma display substrate for a high-precision, inexpensive, thin, large-screen, color plasma display device and a production method thereof.

PRIOR ART

In a plasma display device used for a thin, large-screen, color display device, electrodes are disposed opposite to each other in each space which is surrounded by partitions and referred to as a minute display cell. Phosphor films are formed on the partition surfaces, and the space is filled with a dischargeable gas, such as a rare gas. In this structure, the phosphor is caused to emit light by plasma generated because of discharge between the opposed electrodes, whereby the display device is used as a light-emitting device for a display screen.

A substrate 1 has such a concrete structure as that shown in FIG. 10; namely, a plurality of partitions 11 are formed on one of the surfaces of a rear plate 10, a space between every two adjacent partitions is defined as a display cell 13, and an electrode 12 is disposed on the bottom surface of the cell 13. Phosphor is coated on the inner wall surface 13a of the cell 13 of the substrate 1. A front plate 14 provided with an electrode 15 on the rear surface thereof is joined to the partitions 11 of the substrate 1, and the cell 13 is filled with a discharge gas, thereby forming a plasma display device.

When the plasma display substrate is produced in a conventional manner, a partition is formed between every two electrodes 12 after a plurality of electrodes 12 have been formed on the rear plate 10 in advance. As methods for forming the partitions 11, the print lamination method, the green sheet multi-layer lamination method and the blast grinding method are known.

In the print lamination method, the partitions 11 having a predetermined pattern are printed and formed on the surface of the rear plate 10 by the thick-film printing method by using paste containing the materials of the partitions 11. Since the thickness attained by a single printing process is about 10 to 15 $\mu$m, printing and drying are repeated so as to form the partitions having a height of 100 to 200 $\mu$m (Japanese Unexamined Patent Publication No. 2-21300).

In the above-mentioned green sheet multi-layer lamination method, a plurality of green sheets of ceramics or the like and having a plurality of holes having a predetermined shape are laminated to obtain a height required for the partitions and then fired and formed (Japanese Unexamined Patent Publication No. 1-213936).

Furthermore, in the blasting method, a glass layer having a predetermined thickness is formed on the front surface of the rear plate 10. A resist mask having a front view pattern of the partition 11 is formed on the surface of the glass layer, and the glass layer portions other than the masked portions for the partitions are ground and removed by sandblasting (Japanese Unexamined Patent Publication No. 4-259728).

In order to hermetically seal the spaces in the discharge display cells of the substrate having the partitions formed on the rear plate, a glass material having a low melting point is applied to the upper end portions of the partitions, the front plate made of transparent glass or the like is pressed against and closely contacted with the glass material, and the substrate and the front plate are heated as a whole and integrally joined to each other, thereby forming a plasma display device.

In this plasma display device, only the discharge display cells to which control voltage is applied are caused to emit light so as to prevent improper discharge and color blurring between adjacent cells. It is therefore important to completely isolate the light-emitting cells from the adjacent cells. If the isolation is insufficient, the adjacent cells are induced to emit light, resulting in generating ambiguous and unclear display images and disturbed display on the screen.

To solve this problem, conventional methods have been used. According to one of the methods, a large amount of glass material for joining is applied to the upper end portions of the partitions so that the melted liquid of the glass flows and fills the gaps between the upper end portions of the partitions and the surface of the front plate, thereby ensuring secure joining between the partitions and the front plate. Alternatively, a method for improving pressure distribution applied to the low-melting glass for joining, such as a method for applying hydrostatic pressure or a method for applying pressure by using a plurality of minute pressure application rods, has been used.

However, in the above-mentioned print lamination method, printing and drying must be repeated for lamination in order to form the partitions 11 having a predetermined height, thereby requiring excessively many processing steps. Furthermore, the partition 11 is apt to be deformed easily because of dislocation during printing, whereby printing for each lamination cannot be performed accurately. Because of the deformation, such as the elongation, of a printing block, the dimensional accuracy of the display cell formed by the partitions 11, that is, the difference (maximum difference) between the maximum and the minimum of measured values obtained by measuring the lengths of 45 rows of 1000 cells is about 0.35 mm. This accuracy is insufficient for plasma display devices, and cannot satisfy the needs for high definition.

Even in the above-mentioned blasting method, the process of the method is complicated, since sandblasting is performed after photoresist is applied for mask formation, and it is difficult to form the partitions accurately. In addition, when abrasives for blasting are recovered and used repeatedly, the grinding capability of the abrasives will be lowered and variable with time, making it difficult to perform stable grinding for mass production. On the other hand, when the abrasives are used without recovering them, the cost of the abrasives becomes high, also making it difficult to perform grinding for mass production. As described above, it is difficult to produce large plasma display substrates having highly accurate minute pitches by using simple processes in the case of the conventional methods.

Furthermore, in the conventional plasma display substrate 1, since the side surface 11a of the partition 11 is perpendicular to the rear plate 10 as shown in FIG. 10, the phosphor applied to the cell wastefully stands at the bottoms of the partitions 11, namely, the corners of the cells. Furthermore, since the partition 11 itself must have a certain width to have necessary strength, the opening of the cell 13 cannot be made large, thereby restricting the intensity of light emission.

Moreover, in the substrate made by the above-mentioned production methods, since the forming process of the partitions 11 differs from the forming process of the electrodes 12, the dislocation between the partitions 11 and the electrodes 12 is apt to occur, thereby causing the problem of incapable of producing substrates having high density and high accuracy. Besides, as shown in FIG. 10, it is inevitable that a gap is present between the electrode 12 and the partitions 11 on the bottom surface of the cell in the case of the conventional production methods. The area occupied by the electrode 12 is thus limited to part of the bottom surface of the cell 13, whereby the discharge area is narrowed and the light emission efficiency is lowered.

In the above-mentioned green sheet multi-layer lamination method, the partitions can be formed easily by laminating and closely contacting a plurality of green sheets having a plurality of holes in their surfaces as a whole. However, when the width of the partition 11 is made smaller with respect to the opening of the cell 13 to decrease the pitch of the cells 13 and to obtain a screen having higher definition, the opening area of the green sheet becomes large and the strength of the green sheet is lowered, thereby making it difficult to accurately position the green sheets during lamination operation.

When a large amount of low-melting glass material is used to join the substrate to the front plate as described above, the heated and melted glass protrudes and increases the joining area of the partitions and the front plate. As a result, the opening area ratio of the discharge display cell is decreased, thereby making the area of the pixel smaller and deteriorating the quality of images. Furthermore, extra melted glass covers the phosphor used as a light emission substance and fastens, thereby decreasing the effective light emission area.

Furthermore, in the method of improving the pressure distribution applied to the low-melting glass, a temperature of 500° C. or more is required to melt the glass, and the size of the substrate for a large-screen display device amounts to 1000 mm or more diagonally. It is therefore difficult to carry out this method because of significant restrictions on production apparatuses and the operation processes thereof.

SUMMARY OF THE DISCLOSURE

A first object of the present invention is to provide a plasma display substrate capable of offering improved dimensional accuracy of partitions used to form the display cells thereof, in particular, capable of easily forming partitions having non-deformed, highly-accurate, flat side surfaces and a predetermined height, and a production method thereof. A second object of the present invention is to provide a production method capable of forming substrates at high yields and low costs by using simple forming processes.

A third object of the present invention is to provide a plasma display substrate having a cell shape capable of allowing phosphor to be applied uniformly and accurately to the side surfaces of the partitions so as to prevent waste of the phosphor material due to nonuniform application, and a production method thereof, and also provide a plasma display substrate having a cell shape having an enlarged light emission area for each display cell so as to obtain higher luminance at the light emission surface of a plasma display device, and a production method thereof.

A fourth object of the present invention is to provide a large, high-density plasma display substrate capable of easily attaining a plasma display device having a large screen of 40 inches or more and capable of attaining the display cells of the substrate at a cell pitch of less than 0.25 mm so as to achieve high definition and high density, and a production method thereof.

Generally speaking, in accordance with the first and second objects, in a first embodiment of the present invention, independently of the rear plate made of ceramics or glass and used as a basic component of a plasma display substrate, a plurality of partitions used to define partitioned display cells are formed with ceramics or glass so as to have an accurate shape and an accurate disposition, whereby the partitions are integrally joined to the rear plate to form a plasma display substrate.

More particularly, in the present invention, a mold having a plurality of cavities, the shape of which has been accurately copied from the shape of the partition in advance, is used to form the partitions, the cavities of the mold is filled with a material mixture containing ceramics or glass as a main ingredient for molding the partitions to obtain molded partitions for the partitions, and the molded partitions are integrally joined to the surface of a rear plate, namely, another member, thereby obtaining a plasma display substrate comprising the partitions and the rear plate.

In other words, the plasma display substrate in accordance with the present invention comprises a rear plate and a plurality of partitions for forming display cells between every two adjacent partitions on one of the surfaces of the rear plate, the substrate being characterized in that the partitions made of the mixture of ceramic or glass powder and a binder are formed in a desired shape and a desired disposition on one of the surfaces of the rear plate made of ceramics or glass, and integrally joined to the rear plate.

With respect to the fourth object, a plasma display substrate, wherein the maximum difference in measured values obtained by measuring the lengths of 45 rows of 1000 display cells each formed between every two partitions is 0.5 mm or less, is also included in a substrate in accordance with the present invention. In the above description, the maximum difference is the difference between the minimum and the maximum of measured values obtained by measuring the above-mentioned lengths.

Furthermore, in the second embodiment, to attain the third object, display cells formed by every two adjacent partitions disposed on the rear plate have a shape being made wider in the direction from the rear plate side to the front side, namely, to the front plate side. In other words, the substrate of the second invention comprises the partitions made by molded partitions obtained by filling the cavities for molding the partitions with a mixture of ceramic or glass powder and a binder, and a rear plate made of ceramics or glass, the partitions being integrally joined to the rear plate, and the width of the display cell formed between every two adjacent partitions being made larger in the direction from the rear plate side to the front side.

Since the precision of the shape of the display cells can be controlled easily by using the molded partitions, the width of the partitions can be controlled to be made smaller toward the upper end portions thereof, and the width of the inner shape of the cell can be made larger in the direction from the rear plate side to the front, thereby offering the advantage of increasing the intensity of light emission due to a widened light emission area. In addition, since the partitions have tilted surfaces, the amount of phosphor standing at the corners of the cell can be decreased at the time of the application of the phosphor to the cell, thereby offering the advantage of forming uniform phosphor films on the side surfaces of the partitions.

Furthermore, the substrate should preferably be provided with an electrode on the entire surface of the bottom surface of the display cell formed between every two partitions. By using the entire bottom surface of the cell, the dislocation between the partitions and the electrode can be prevented and the discharge area can be expanded to the entire bottom surface, thereby offering the advantage of increasing the light emission efficiency of the phosphor.

Moreover, the substrate should preferably be curved convexly to the partition side. When the curved substrate is made contact with a flat front plate, the front plate contacts the upper end portion of each partition at a single point. A low-melting glass material is applied to the upper end portion of the partition, the front plate is softened by heating at the time of joining, and then the front plate is bent by applying pressure from the peripheral portions of the front plate to the substrate side. As a result, the contact point between the surface of the front plate and the upper end portion of the partition is moved right and left successively and continuously from the single point to the partition. Consequently, the entire surface of the front plate is made contact with the partition along the entire length of the partition via melted glass and joined with the partition. With this respect, the substrate should preferably be curved in the longitudinal direction of the partition. In a third embodiment, in accordance with the first and second objects, the production method of a plasma display substrate comprises a first step of making molded partitions in a desired shape and a desired disposition by filling the mold having the cavities for molding the partitions with the mixture of ceramic or glass powder and a binder inclusive of organic additives and solvents, and a second step of integrally joining the molded partitions to one of the surfaces of the rear plate made of ceramics or glass by contacting the molded partitions with the surface of the rear plate after the separation of the molded partitions from the mold.

In a fourth embodiment, in accordance with the third object, to obtain the display cell of the substrate having a width made larger at the end thereof, the width of the cavities of the mold for molding the partitions is made smaller at the bottom sides thereof, and the width of the partitions are made narrower at the ends thereof, whereby the width of each display cell between two partitions formed on the rear plate is made larger in the direction from the rear plate side to the front in the above-mentioned production method.

In the production method of the present invention, it is preferable that the cavities of the mold are filled with the mixture, and an electrode material is applied to the convex portions disposed between the cavities so as to mold the partitions in the first step, and that the molded partitions made of the mixture and the electrode material are integrally joined to the rear plate made of ceramics or glass in the second step. Consequently, the steps for molding the partitions and the electrodes can be unified, the partitions and the electrodes can be positioned easily and accurately, the entire bottom surface of each cell can be used for the formation of an electrode, thereby being effective in improving the light emission efficiency of the cell.

Furthermore, it is preferable that an organic silicate compound is added in the mixture. The amount of the addition can be 5 to 60 weight parts in the 100 weight parts of ceramics or glass. The organic silicate compound becomes glassy during firing and remains. As a result, the amount of volumetric shrinkage can be decreased, thereby preventing the partitions from being deformed or flattened during firing. In particular, since the shape of the cavities of the mold can be accurately reproduced in the shape of the molded partitions made of the mixture, and the molded partitions are not deformed significantly during firing, and not dislocated in the molding and firing processes, whereby partitions having proper, flat and accurate surfaces and also having a predetermined height can be obtained.

Since an organic silicate compound having organically reactive functional groups can be used, the ceramic or glass powder can be combined firmly with organic additives by the polymerization of the organic silicate compound, and the strength of the molded partitions before firing can be improved.

In the production method of the present invention, a step of curving the rear plate heated and softened to form a convex shape toward the partition side at the time of firing the molded partitions transferred to the rear plate so as to produce a curved substrate can be included in the above-mentioned second step. Alternatively, the substrate can be heated, softened and curved convexly toward the partition side after the second step. The above-mentioned third step can also be used as a step for baking and securing the electrodes in the cells.

The present invention includes a production method of a plasma display device, wherein a low-melting glass is applied to the upper end portions of the partitions of the above-mentioned curved substrate, the front plate is made contact with the upper end portions of the partitions via the low-melting glass under pressure and heated, and then the substrate is integrally joined to the front plate.

BRIEF DESCRIPTION OF THE DRAWINGS

FIG. 2b is a perspective view of the display device shown in FIG. 2a;

DETAILED DESCRIPTION OF THE PREFERRED EMBODIMENTS

Figure 1A:
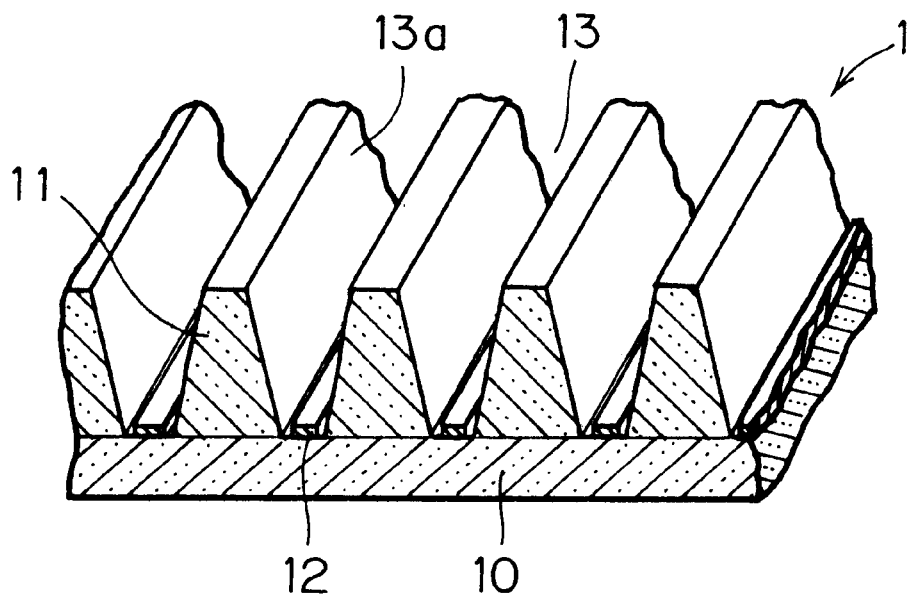
FIG. 1a is a fragmentary perspective view of a plasma display substrate having partitions and electrodes formed on a rear plate.

Embodiments in accordance with the present invention are described below referring to the drawings.

FIG. 1a shows an embodiment of a plasma display substrate in accordance with the present invention. A substrate 1 is made by integrally joining a plurality of partitions 11 made of ceramics or glass onto the surface of a rear plate 10 made of ceramics or glass, and the space between every two adjacent partitions 11 is used as a display cell 13.

Figure 2A:
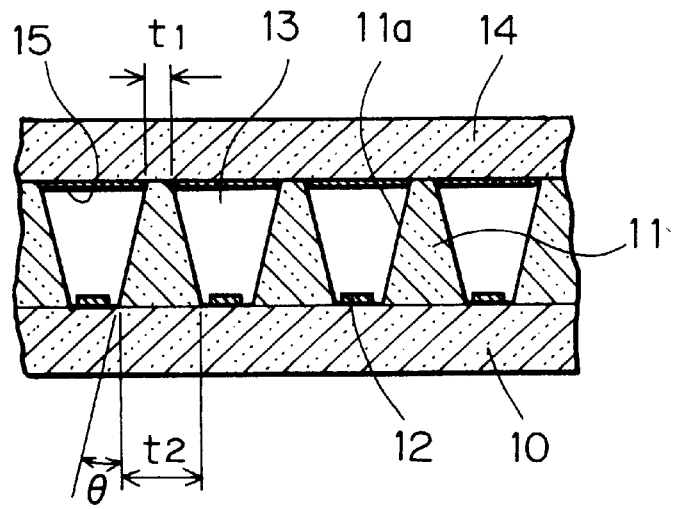
FIG. 2a is a fragmentary sectional view of a display device, wherein a substrate is joined to a front plate.
Figure 2B:
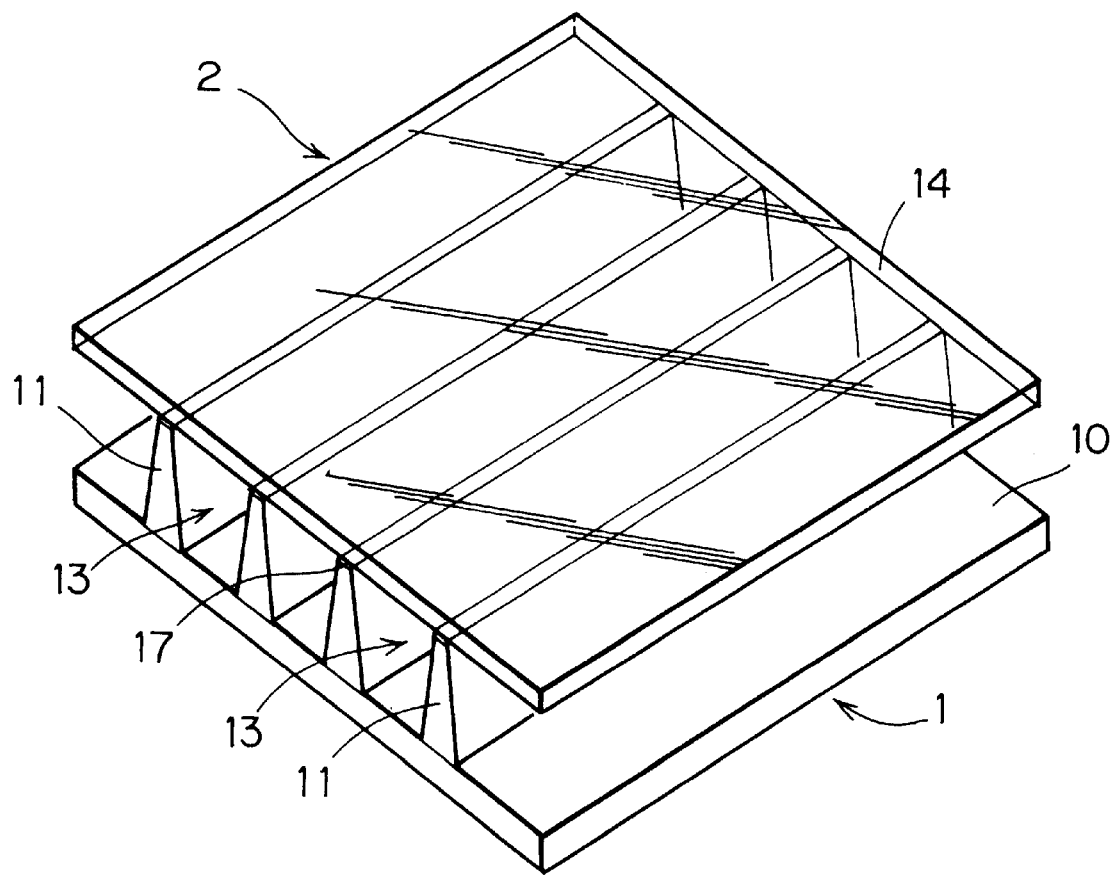

In addition, an electrode 12 is disposed on the bottom surface of the cell 13, a phosphor 16 is formed on the side surfaces 13a of the cell 13, a front plate 14 provided with an electrode 15 covers the upper end portions of the partitions 11 as shown in FIGS. 2a and 2b. The cell 13 is filled with a discharge gas, thereby forming a plasma display device. When the display device is used for display, discharge is caused by applying voltage across the electrodes 12 and 15, and the phosphor on the inside surface of the cell 13 is caused to emit light.

Figure 1B:
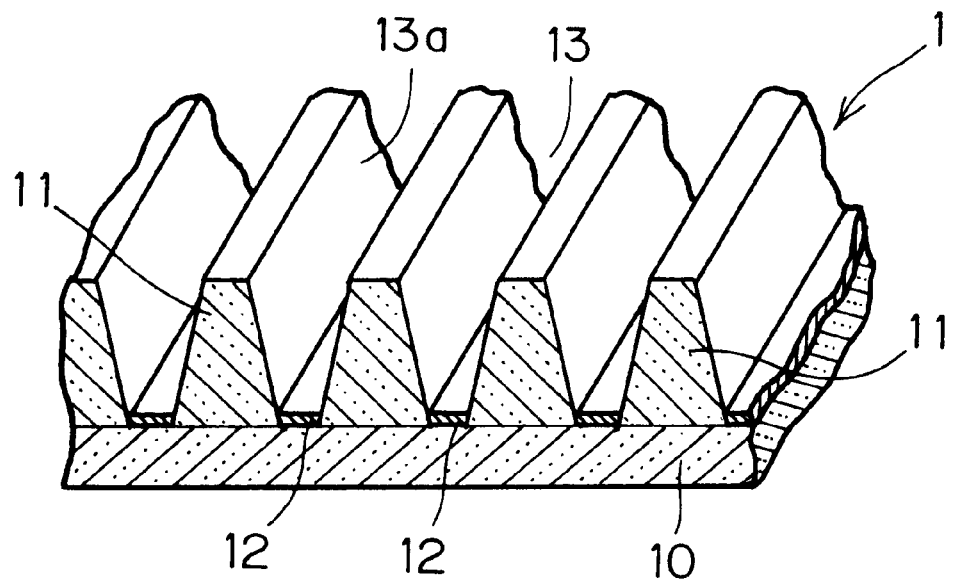
FIG. 1b is a view similar to FIG. 1a, showing a substrate having electrodes on the entire bottom surfaces between every two adjacent partitions.

As shown in FIG. 1b, the electrodes 12 are formed on the entire bottom surfaces of the cell 13 provided between every two adjacent partitions.

Figure 3A:
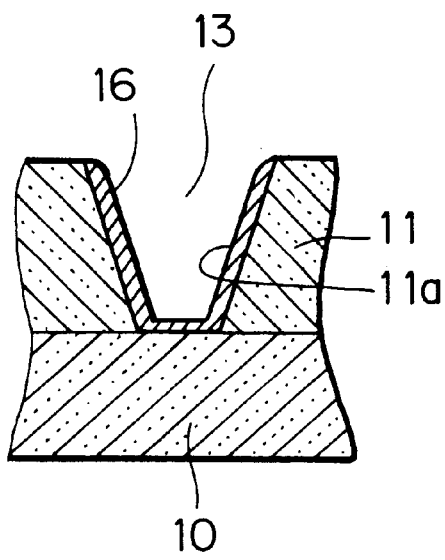
FIG. 3a is a fragmentary sectional view of a phosphor film applied to the inside of a display cell of the substrate.

As shown in FIGS. 2a and 3a, the thickness t1 of the upper end portion of the partition on the front side is made smaller than the thickness t2 of the root portion of the partition on the side of the rear plate 10 so that the partition is made thinner in the direction from the rear to the front. A side surface 11a thus becomes a tilted surface. Accordingly, the width of the cell 13 formed between the partitions 11 is made larger in the direction from the rear plate 10 to the front. With this structure, when phosphor is applied to the side surface 11a, phosphor can be applied uniformly to the tilted surface and can prevent the wastage of the phosphor due to standing at the corners of the cell 13.

Figure 3B:
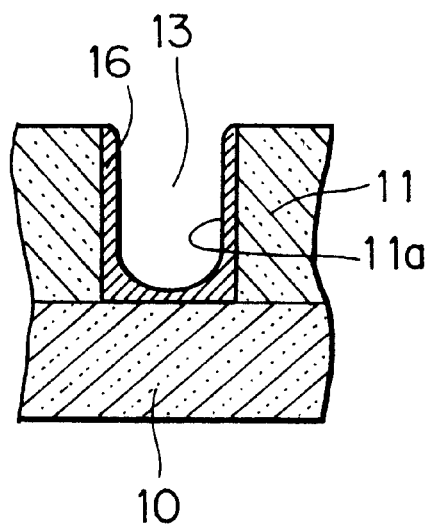
FIG. 3b is a view similar to FIG. 3a, showing a conventional embodiment.

In a conventional partition, since the side surface 11a is perpendicular to the rear plate 10 as shown in FIG. 3b, phosphor 16 applied to the side surface 11a in a slurry form flows downward and stands wastefully at the corners. When the partition 11 is made narrower in the direction from the rear to the front as shown in FIG. 3a, the side surface 11a becomes a tilted surface. The phosphor in a slurry form is uniformly applied to the tilted surface, thereby preventing the wastage of the phosphor due to standing at the corners. In addition, since the opening area of the cell 13 is made larger, the intensity of light emission is increased, and sufficient light emission can be observed even when the cell 13 is viewed obliquely. In FIG. 2a, the angle θ between the side surface 11a of the partition and the normal line of the rear plate should preferably be in the range of 1 to 45°. If the angle θ is less than 1°, the above-mentioned effect cannot be delivered sufficiently, and a draft angle required when removing the molded partitions made of the mixture from the cavities of the mold cannot be obtained as described below. On the other hand, if the angle is more than 45°, the pitch of the partitions 11 is made larger, resulting in lower definition. More preferably, the angle should be in the range of 2 to 40°.

Figure 4:
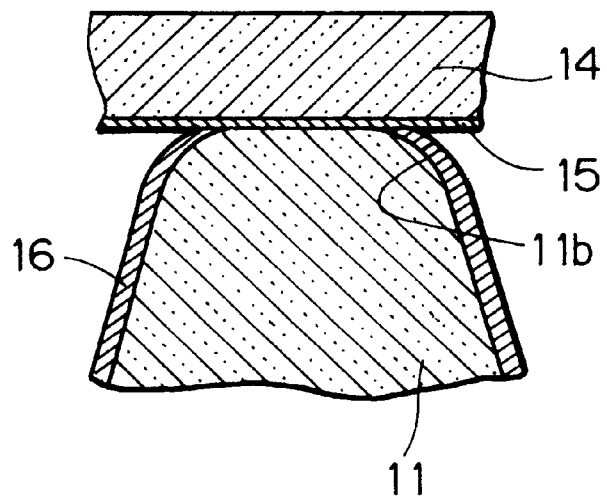
FIG. 4 is a fragmentary sectional view showing a joining condition of the upper end portion of the partition on the substrate and the front plate.

Furthermore, as shown in FIG. 4, round chamfered portions 11b should preferably be provided at the upper end portion of the partition 11. At the time of the application of the phosphor 16, the phosphor 16 is also applied to the chamfered portions 11b, and the film of the phosphor 16 is formed on the chamfered portions 11b, thereby increasing the light emission area.

Figure 5A:
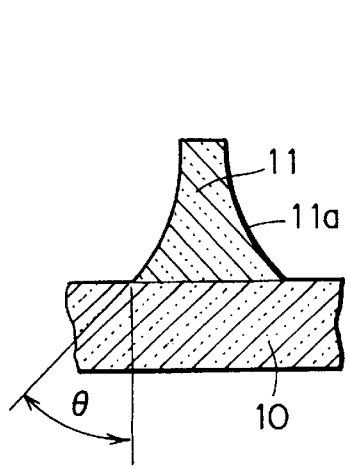
FIGS. 5a, 5b, 5c and 5d are sectional views showing the partitions on the substrate.
Figure 5B:
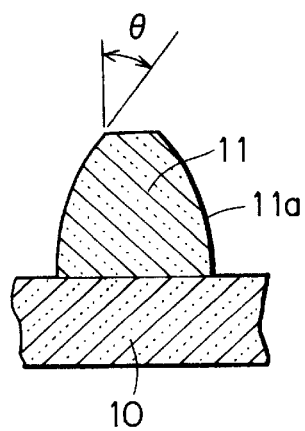
Figure 5C:
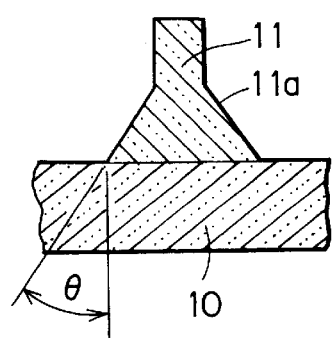
Figure 5D:
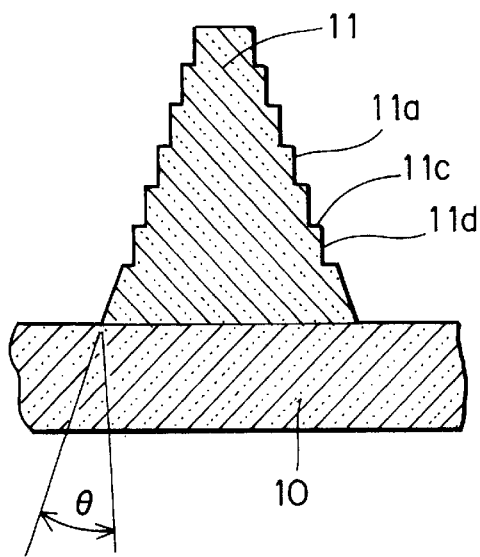

As other embodiments of the partition 11, the partition 11 shown in FIG. 5a has a side surface 11a having a concavely curved shape, the partition 11 shown in FIG. 5b has a side surface 11a having a convexly curved shape, and the partition 11 shown in FIG. 5c has a side surface 11a having a shape of the combination of a tilted surface and a perpendicular surface. In all the embodiments, the partition 11 is made narrower in the direction from the rear to the front, that is, the thickness of the upper end portion on the front side is made smaller than the thickness at the root portion on the rear plate side.

Moreover, the angle between the side surface 11b and the normal line of the rear plate 10 is determined in the range of 1 to 45°, preferably in the range of 2 to 40°. When the side surface 11a is not a completely linearly tilted surface just as in the above-mentioned embodiments, the angle between the side surface 11b and the normal line of the rear plate 10 should be in the above-mentioned range either at the root portion or the upper end portion of the side surface 11a.

Besides, the partition 11 shown in FIG. 5b has stepwise surfaces comprising surfaces 11d nearly parallel to the normal line of the rear plate 10 and surfaces 11c nearly perpendicular to the normal line of the rear plate 10. Even in this case, the width of the cell 13 between two adjacent partitions can be made larger in the direction to the front.

Figure 6A:
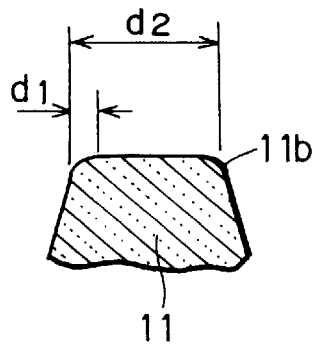
FIGS. 6a, 6b, 6c, 6d and 6e are views showing the chamfered portions disposed at the upper end portions of the partitions on the substrate.
Figure 6B:
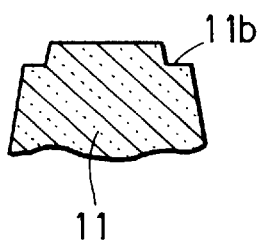
Figure 6C:
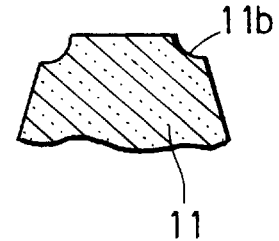
Figure 6D:
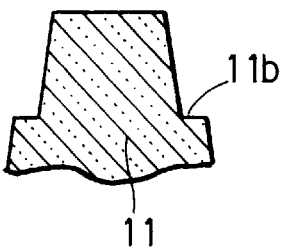
Figure 6E:
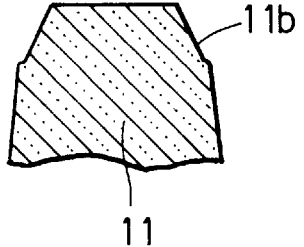

In addition, the chamfered portion 11b provided at the upper end portion of the partition 11 can take the following shapes; a round chamfered portion 11b shown in FIG. 6a, a step-chamfered portion 11b shown in FIG. 6b, a concavely curved chamfered portion 11b shown in FIG. 6c, a deeply step-chamfered portion 11b shown in FIG. 6d, and a tilted chamfered portion 11b shown in FIG. 6e. The thickness d1 of the chamfered portion 11b of these embodiments can be ⅓ or less of the thickness d2 of the upper end portion of the partition 11 because of the following reason. If the thickness of the chamfered portion is larger than ⅓ of the thickness of the upper end portion, the upper end portion becomes too narrow, thereby preventing proper contact with the front plate, and lowering the strength of the upper end portion.

The substrate comprises a flat rear plate and partitions and is flat as a whole. As shown in FIGS. 2a and 2b, a flat transparent front plate is jointed to the upper end portions of the partitions via low-melting glass to form a plasma display device.

Figure 7:
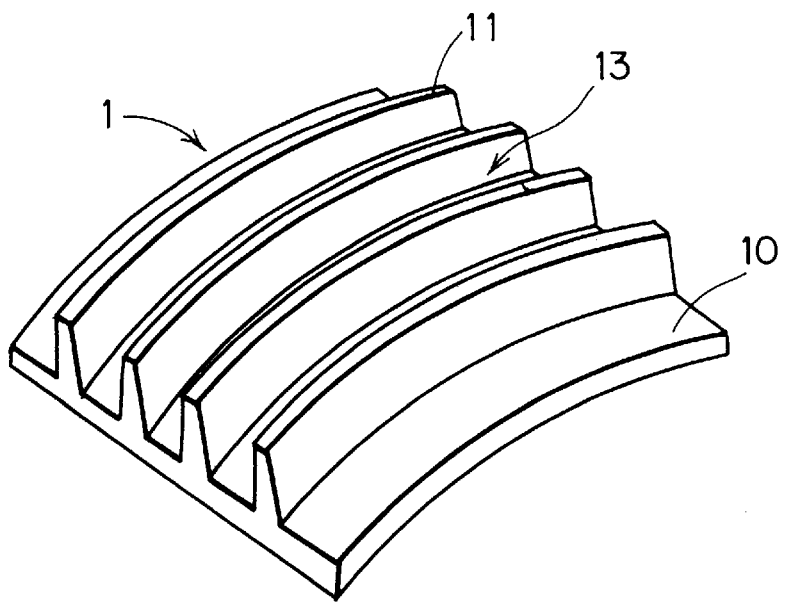
FIG. 7 is a fragmentary perspective view showing a curved substrate.

In the present invention, the substrate 1 having the rear plate 10 convexly curved toward the partition side is preferably adopted. FIG. 7 shows a substrate having the rear plate 10 convexly curved toward the partition side. This substrate 1 is joined to the transparent front plate 14 curved along the curved upper end portions of the partition 11 to form a plasma display device.

The shape of the rear plate 10 which is convexly curved toward the partition side is a shape wherein the upper end portion of the partition 11 substantially integrally formed on the rear plate 10 makes contact with the flat front plate 14 at a single point. The shape can be evaluated by the radius of curvature of the substrate contour line at the perpendicular section nearly passing the central portion of the substrate and extending to the two opposed sides. The substrate 1 should satisfy the condition of the radius of curvature described below in the direction of the opposed long side portions or the opposed short side portions of the substrate 1.

The radius of curvature of the curved substrate 1 should be in the range of 5 to 15 m. If the radius of curvature is less than 5 m, the formed cells may be deformed when the rear plate 10 is joined to the front plate 14 at high temperature because of a significant difference in joining pressure between the central portion and the peripheral portion. On the other hand, if the radius of curvature is more than 15 m, the joining between the rear plate 10 and the front plate 14 becomes nonuniform, and the complete isolation between the cells may become insufficient.

The production method for the substrate is described below.

Figure 8A:
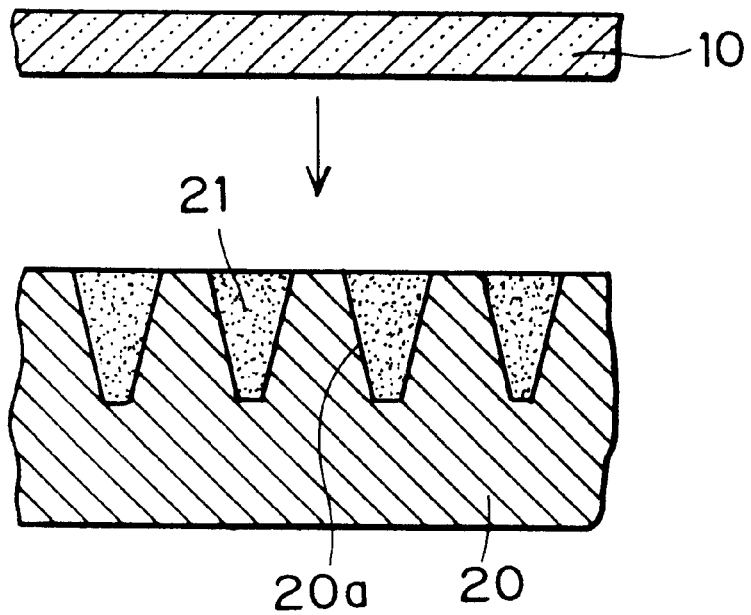
FIG. 8a is a view showing a step for forming molded partitions by using a mold and by filling the cavities formed in the mold with a mixture to mold the partitions.

In the first step, as shown in FIG. 8a, a mold 20 is prepared, which is provided with a plurality of cavities 20a formed by copying the shape of the partitions 11. As the material for the partitions 11, a mixture of ceramic or glass powder and a binder inclusive of organic additives and solvents is prepared in a soft paste state. The cavities 20a of the mold 20 is filled with this paste mixture to perform molding in the cavities 20a.

In the second step, the rear plate 10 made of ceramics or glass is prepared separately, and the molded partitions in the cavities 20a of the mold 20 are integrally joined to the surface of the rear plate 10. The actual integration method is described below.

Figure 8B:
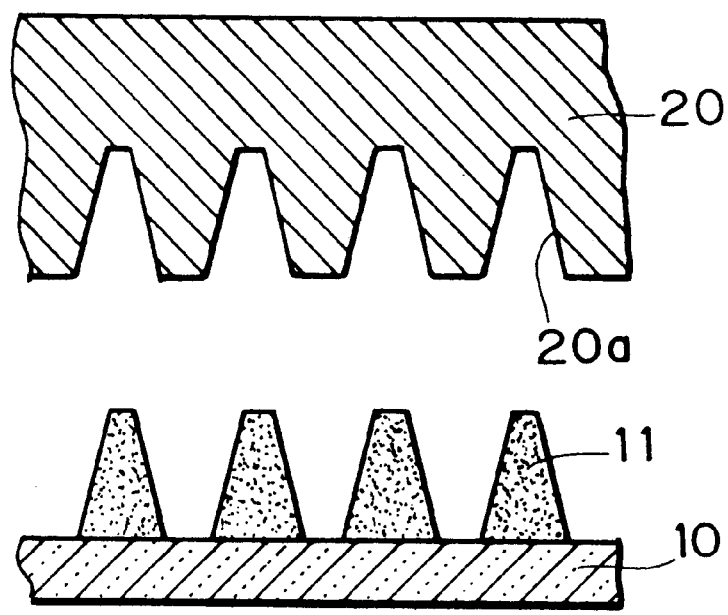
FIG. 8b is a sectional view showing a step for transferring the molded partitions to the rear plate.

First, the molded partitions of a mixture 21 supplied into the mold 20 are pressed against the surface of the rear plate 10 to contact the molded partitions 11 made of the mixture with the surface of the rear plate 10 under pressure, and the mixture is reaction-hardened or dry-caked. The mold 20 is then turned upside down as shown in FIG. 8b to separate the rear plate 10 from the mold 20 and to transfer the molded partitions 11 to the rear plate 10. Both the rear plate 10 and the partitions 11 are then heated so as to subject the partitions 11 to debinder treatment, and the whole is fired to integrally join the molded partitions 11 to the rear plate 10 so as to form the plasma display substrate 1.

Alternatively, as another method, after the molded partitions 11 of the mixture 21 supplied into the mold 20 are reaction-hardened or dry-caked, the molded partitions 11 are separated from the mold 20 and joined to the rear plate 10. In the end, the whole is subjected to debinder treatment and fired simultaneously to perform integration. In this way, the plasma display substrate 1 can also be produced.

Furthermore, as a still another method, after the molded partitions 11 made of the mixture 21 supplied into the mold 20 are reaction-hardened or dry-caked, the molded partitions 11 are separated from the mold 20, subjected to debinder treatment, and joined to the rear plate 10. In the end, the whole is fired to perform integration. In this way, the plasma display substrate 1 can also be produced.

Alternatively, after the molded partitions of the mixture 21 supplied into the mold 20 are reaction-hardened or dry-caked, the molded partitions are separated from the mold 20, subjected to debinder treatment, and fired. The sintered molded partitions are contacted with the rear plate 10, and joined by thermal contact under pressure or simultaneous firing. In this way, the plasma display substrate 1 can also be produced.

In other words, the molded partitions of the mixture 21 can be joined to the rear plate 10 regardless of whether the members to be joined to each other are unfired or fired, or subjected to debinder treatment.

Since the partitions can be formed by a single step in accordance with the above-mentioned production methods, the production process can be shortened. In addition, since the partition 11 is formed by copying the inner surface shape of the cavities 20a of the mold 20, a fine shape can be formed accurately and precisely. As a result, by the production method of the present invention the display cells can be prepared highly accurately, that is, the maximum difference of measured values obtained by measuring the lengths of 45 rows of 1000 cells is 0.05 mm or less.

The electrode 12 disposed on the bottom surface of the cell 13 should be formed on the surface of the rear plate 10 before the partition 11 is joined.

The method for simultaneously forming the electrode 12 and the partition 11 is described below.

Figure 9A:
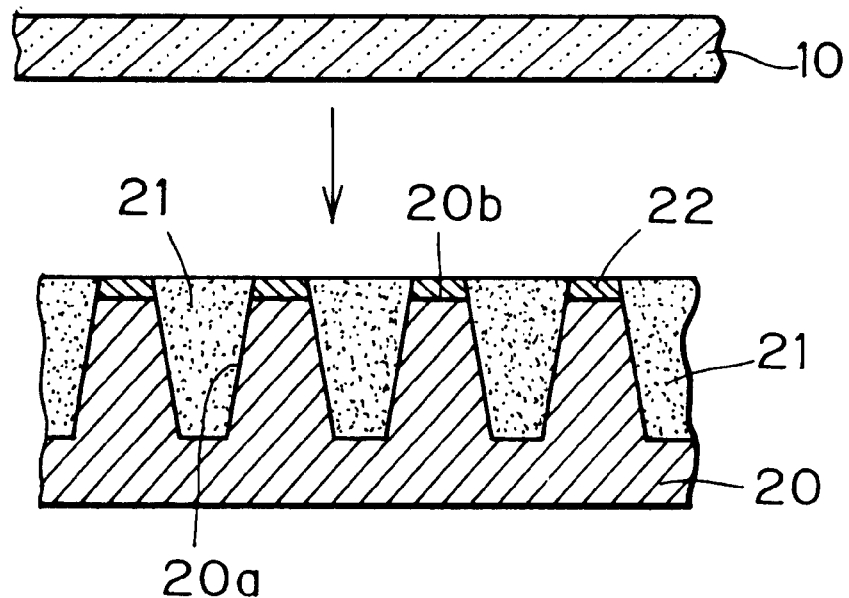
FIGS. 9a and 9b are views similar to FIGS. 8a and 8b, respectively, each showing a step for integrally forming the electrodes on the entire surface of each display cell between two adjacent partitions.

As shown in FIG. 9a, a mold 20 is prepared, which is provided with cavities 20a having a shape corresponding to the shape of the partition 11. An electrode material 22 for forming the electrode 12 is applied to a convex portion 20b disposed between the cavities 20a of the mold 20. The electrode material 22 is a mixture of metal paste or metal powder and a binder inclusive of organic additives and solvents. The electrode material 22 is applied to a separate flat plate, and the flat plate is pressed against the convex portions 20b of the mold 20 so as to transfer the electrode material 22 to the convex portions 20b. Alternatively, the electrode material 22 may be applied to the convex portions 20b of the mold 20 by screen printing or by using rollers.

Next, as the material for the partitions 11, the mixture 21 of ceramic or glass powder and a binder inclusive of organic additives and solvents is prepared in a soft paste state, for example. This paste mixture is supplied into the cavities 20a of the mold 20. At this time, the surface of the electrode material 22 is flush with the surface of the mixture 21 in FIG. 9a. However, the mixture 21 may cover the electrode material 22. In both cases, the molded partitions are produced in a condition having no gap between the mixture 21 and the electrode material 22.

Figure 9B:
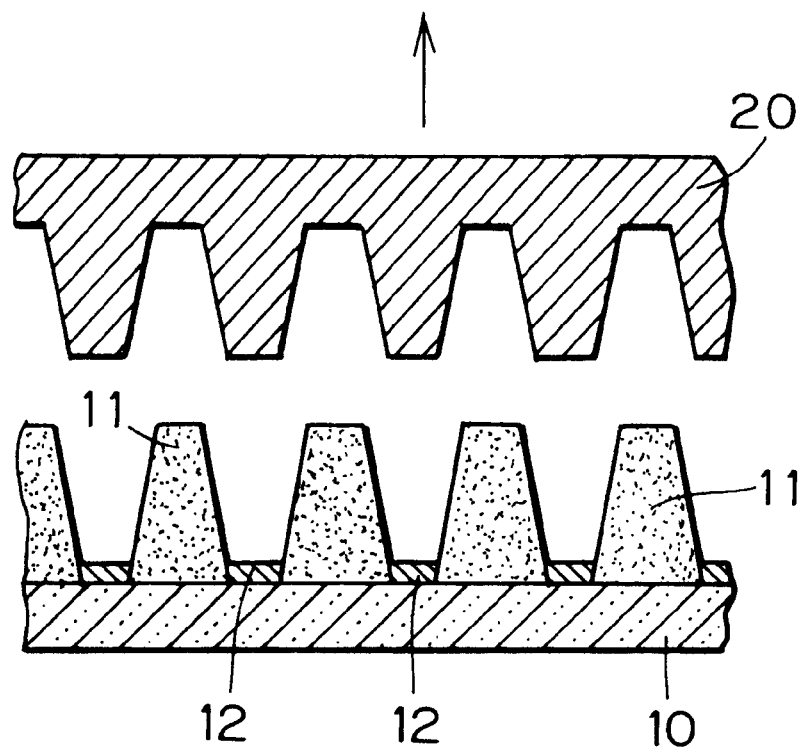
Figure 10:
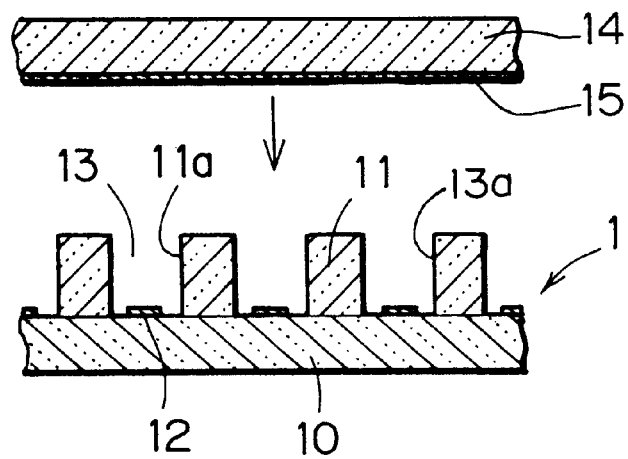
FIG. 10 is a fragmentary sectional view showing a conventional plasma display substrate and a front plate.
Figure 11:
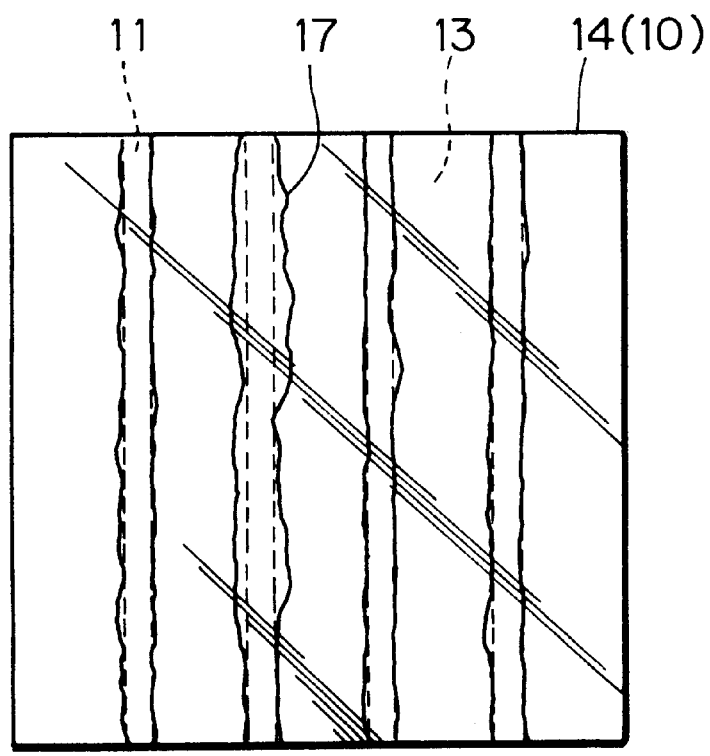
FIG. 11 is a front view showing a display device, wherein the front plate is made contact with the upper end portions of the partitions of the substrate via low-melting glass.

In rear plate 10 made of ceramics or glass is prepared separately. The molded partitions comprising the mixture 21 and the electrode 22 and supplied into the mold 20 are pressed against the surface of the rear plate 10, and then integrated and caked by drying. The mold 20 is then turned upside down as shown in FIG. 9b and separated. As a result, the partitions 11 made of the mixture 21 and the electrode material 22 are transferred alternatively to the rear surface 10, while integrally joined to the rear plate 10. By firing the whole in the end, the plasma display substrate 1 shown in FIG. 1b can be produced.

In the above-mentioned method, the molded partitions of the partitions 11 and the electrode material 22 are simultaneously joined to the rear plate 10 in an unfired condition, and then fired simultaneously in the end. However, the molded partitions of the partitions 11 and the electrode material 22 can be caked and fired independently in advance and can be joined to the rear plate 10 by thermal contact under pressure or by adhesion. In other words, the joining of the partitions 11 and the electrode material 22 to the rear plate 10 can be performed regardless of whether the members to be joined to each other are unfired or fired, or subjected to debinder treatment.

Next, the production method for a curved substrate is described below.

When producing a substrate, the molded partitions obtained by the filling the cavities of the mold with the mixture are disposed on the rear plate in the second step of the above-mentioned method. When the rear plate side of the substrate is placed on a holder, the upper surface of which has a predetermined radius of curvature, and subjected to high temperature in a subsequent heating process, the rear plate is slightly softened and bent by its own weight. As a result, the bottom surface of the rear plate contacts the upper surface of the curved holder and is curved. The holder used in this way should be made of a material which is not deformed at the heating temperature, does not cause reaction with the rear plate at high temperature, and does not become sticky with the rear plate.

The thermal treatment for curve formation is performed by using a heating process wherein the molded partitions are sintered when the molded partitions are fired and joined to the rear plate made of ceramics or glass in the second step, more specifically, at about 400 to 600° C. In addition, the thermal treatment for curve formation is performed by using a heating process wherein after the partitions are integrally joined to the rear plate the electrode material is applied to the bottom surface of the cell between two adjacent partitions and fired at 400 to 700° C. Furthermore, the thermal treatment for curve formation is performed by using a process wherein after the phosphor is applied to the inner surface of the cell the film of the phosphor is baked at 200 to 400° C. Besides, a heating process independent of the above-mentioned heating processes can also be used as a matter of course.

It is particularly preferable that the molded partitions and the flat front plate are sintered and joined to each other during the heating treatment for curve formation. The temperature range of 500 to 600° C. is best suitable.

When the rear plate and the partitions are made of glass, for example, the actual heat treatment temperature and treatment time differ depending on the softening point, fluid point, devitrification time, etc. of the glass. The temperature should preferably be in the range of about 400 to 600° C., and the treatment time should preferably be in the range of 10 minutes to 4 hours. If the heat treatment temperature is less than 400° C., or if the heat treatment time is less than 10 minutes, the rear plate is not curved sufficiently, and the desired shape of the substrate may not be obtained. On the other hand, if the heat treatment temperature is more than 600° C. or if the heat treatment time is more than 4 hours, the thickness of the rear plate may vary.

When the rear plate and the partitions are made of ceramics, the heat treatment temperature should preferably be in the range of 400 to 600° C., and the treatment time should preferably be in the range of 2 to 48 hours because of the same reasons just as in the case of those made of glass.

When joining the front plate to the curved rear plate, heat treatment should preferably be performed as described below; low-melting glass is applied to the upper end portions of the partitions on the rear plate, the front plate is aligned with and joined to the rear plate, the periphery of the substrate is secured with jigs, and then the substrate is heat-treated for thermal joining. As the treatment conditions in this case, the temperature should preferably be in the range of about 100 to 450° C., and the treatment time should preferably be in the range of 2 to 12 hours. As the pressure applied to the rear plate during the treatment, a low pressure of about 0.05 to 1 kg/cm$^2$ is sufficient. This is because sufficient pressure can be obtained at the central portion of the rear plate owing to the convexly curved deformation of the rear plate by simply securing the periphery of the rear plate. Besides, a method for applying pressure by using hydrostatic pressure, a plurality of minute pressure rods or rollers can also be used, provided that there is no restriction in production apparatuses.

The rear plate is not limited to that made of glass or ceramics, but a rear plate made of a metal or the like can also be used, provided that it can be curved convexly by heat treatment during the production process or by an independent heat treatment process and that it can be softened easily by heating in the step of joining the rear plate to the front plate.

As low-melting glass for joining, soda-lime glass is suitable with respect to the melting point and cost of the glass. The glass can be applied in various methods, such as the screen printing method and the transfer method. A method of performing patterning so as to match a pattern with the patterns of the partitions is effective in controlling the amount of the glass to be applied, although the patterning is not particularly necessary.

As the ceramics powder for the partition 11, oxide-based ceramics, such as alumina ($Al_2O_3$) and zirconia ($ZrO_2$); non-oxide-based ceramics, such as silicon nitride ($Si_3N_4$), aluminum nitride (AlN) and silicon carbide (SiC); or apatite ($Ca_5(PO_4)_3$(F, Cl, OH) can be used. Various sintering aids can be added in desired amounts to these kinds of ceramics powder.

Moreover, when glass or ceramics for the partitions has a low dielectric constant, charges can move easily. When such glass or ceramics is used for a plasma display device, the luminance of the device can be enhanced. In particular, glass or ceramics having a dielectric constant of 7 or less is preferable.

As sintering aids, silica ($SiO_2$), calcia (CaO), yttria ($Y_2O_3$), magnesia (MgO), etc. can be added to alumina powder; yttria ($Y_2O_3$) and the oxides of rare earth elements, such as cerium (Ce), dysprosium (Dy) and ytterbium (Yb), can be added to zirconia powder; yttria ($Y_2O_3$), alumina ($Al_2O_3$), etc. can be added to silicon nitride powder; the oxides ($RE_2O_3$) of the 3a element in the periodic table or the like can be added to aluminum nitride powder; and boron (B), carbon (C), etc. can be added to silicon carbide powder; in desired amounts.

As the glass powder for the partition 11, various glasses containing silicate as a main ingredient and also containing one or more kinds of lead (Pb), sulfur (S), selenium (Se), alum, etc. can be used.

The ceramics or glass particles having a diameter in the range of about 50 $\mu$m to submicron can be used suitably. More specifically, the diameter should be in the range of 0.2 to 10 $\mu$m, or preferably in the range of 0.2 to 5 $\mu$m.

Furthermore, as organic additives to be added to the ceramic or glass powder, urea resin, melamine resin, phenol resin, epoxy resin, unsaturated polyester resin, alkyd resin, urethane resin, ebonite, polysiloxane silicate, etc. can be used. As a means for reaction-hardening these organic additives, thermosetting, curing by irradiation of ultraviolet rays, curing by irradiation of X-rays, etc. can be used. Among these means, thermosetting is best suited in consideration of operations and apparatuses, and unsaturated polyester resin is best suited in consideration of pot life.

In the composition of the above-mentioned organic additives, the composition is required to have a low viscosity so as to maintain the fluidity and formability of the mixture of the ceramic or glass powder and sintering aids. On the other hand, when hardened, the composition is desired to have a sufficient form maintaining capability. Based on these considerations, when the content of the ceramic or glass powder is 100 weight parts, the content of the organic additives should be 0.5 weight parts or more and 35 weight parts or less in consideration of the contraction of the molded partitions due to curing. In particular, to reduce contraction during firing, the content should most suitably be in the range of 1 to 15 weight parts.

Furthermore, as solvents to be added in the mixture 21, any solvents can be used without limitations, provided that they have compatibility with the above-mentioned organic additives. For example, aromatic solvents, such as toluene, xylene, benzene and phthalate; higher alcohols, such as hexanol, octanol and dodecanol; polyhydric alcohols and their derivatives, such as ethylene glycol, diethylene glycol, diethylene glycol methyl, triethylene glycol and triethylene glycol phenyl; oxyalcohols; esters, such as acetate, such as butyl acetate, and glyceride can be used.

In particular, the above-mentioned phthalate and oxyalcohols can be used suitably. Furthermore, to allow solvents to evaporate gradually, two or more kinds of the above-mentioned solvents can be used together.

Furthermore, when the content of ceramic or glass powder is 100 weight parts, the content of the solvent should be 0.1 weight parts or more to keep the shape maintaining capability of the molded partitions. On the other hand, the content of the solvent should preferably be 35 weight parts or less, since the viscosity of the mixture of ceramic or glass powder and organic additives is desired to be low. When the contraction during drying and firing is considered, it is particularly preferable that the content is in the range of 1 to 15 weight parts.

In the production method of the present invention, to reduce the contraction amount of the molded partitions when the partitions made of the mixture obtained from the mold are fired to form the partitions, an organic silicate compound can be added to the mixture of the ceramic or glass powder and the binder.

As organic silicate compounds, silane compounds, such as tetramethoxy silane, trimethoxy methyl silane, dimethoxy dimethyl silane, methoxy trimethyl silane, tetraethoxy silane, triethoxy ethyl silane, diethoxy diethyl silane, ethoxy triethyl silane, trimethoxy ethyl silane, dimethoxy diethyl silane and methoxy triethyl silane; and dealcoholized polymers of these compounds can be used.

Furthermore, as organic silicate compounds, those having organic reactive functional groups can be used preferably. The organic reactive functional groups are functional groups capable of being polymerized by heat, irradiation of ultraviolet rays, irradiation of electron beams or polymerization initiators, and more specifically, include the vinyl group, acrylate group, epoxy group, urethane group, amino group, phenol group, etc.

Organic silicate compounds having these functional groups may include polymethoxy dimethyl silane, vinyl triethoxy silane, vinyl trimethoxy silane, γ-methacrythoxy propyl trimethoxy silane, β-(3,4 epoxy cyclohexyl)ethyl trimethoxy silane, γ-glycidoxy propyl trimethoxy silane, N-β-(aminoethyl)-γ-aminopropyl trimethoxy silane, N-phenyl-γ-aminopropyl trimethoxy silane, γ-trichloropropyl trimethoxy silane, etc.

Furthermore, among the above-mentioned organic silicate compounds, two or more kinds of the compounds can be used together in addition to the use of only one kind. The suitable content of the organic silicate compound should be in the range of 5 to 60 weight parts when the ceramic or glass powder amounts to 100 weight parts. If the content is less than 5 weight parts, the compound is ineffective in reducing the contraction of the partitions during firing and also ineffective in preventing the deformation of the partitions during firing. On the other hand, if the content is more than 60 weight parts, it has been confirmed that cracking is apt to occur during firing because of the dealcohlization reaction of silicate, thereby causing undesirable results. In particular, the content of the organic silicate compound should most suitably be in the range of 5 to 40 weight parts.

Moreover, as the electrode member 22 to be formed together with the partitions of the present invention, paste of a single component of Ag, Pd, Pt, Au, W or the like, or paste inclusive of a combination of these components can be used. In addition, a mixture of powder of these metals and a binder inclusive of solvents and organic additives can also be used.

The mold 20 in accordance with the present invention is not limited to be made of a particular material. Any material can be used, provided that the material does not cause problems when the organic additives are hardened. For example, metal, resin, rubber, etc. can be used. When necessary, the mold 20 may be subjected to surface treatment, such as surface coating, to improve mold separation and to prevent wear.

The rear plate 10 is an unfired green sheet or a sintered body of such a green sheet. Although the rear plate 10 is not limited to be made of a particular material, the material should be a green sheet of various ceramics, various glass or ceramics substrates, etc. In particular, the thermal expansion coefficient of the material is desired to be close to that of the partition 11. As a glass substrate, relatively inexpensive glass, such as soda-lime glass and glass including distributed inorganic fillers used to correct the distortion of soda-lime glass, can be used.

The joining of the molded partitions made of the mixture 21 and the electrode material 21 to the rear plate 10 can be done by contact under pressure without intervening anything therebetween. However, inorganic or organic adhesive may be used.

In addition, when the molded partitions made of the mixture 21 are made contact with the rear plate 10 under pressure, or when the molded partitions made of the mixture 21 and the electrode material 22 are made contact with the rear plate 10 under pressure, variable coupling agents, such as a silane coupling agent, a titanate coupling agent and an aluminate coupling agent, can be used to improve contact performance. In particular, the silane coupling agent is used most preferably because of its high reactivity.

Furthermore, the contact of the molded partitions made of the mixture 21 with the rear plate 10 under pressure should preferably be performed by using a hydrostatic pressure apparatus to attain uniform pressure application. The pressure should be in a range of not deforming the mold 20. Although the pressure range depends on the strength of the forming body 20, a pressure of about 100 g/cm$^2$ is suited when the mold 20 is made of silicon rubber, for example.

Moreover, for example, a surface active agents, such as polyethylene glycol ether, algin sulfonate, polycarboxylate and alkyl ammonium salt, may be added to the mixture 21 so as to improve the dispersibility of the ceramic or glass powder. The content of the agent should preferably be in the range of 0.05 to 5 weight parts in consideration of improvement in dispersibility and thermal decomposition, when the ceramic or glass powder amounts to 100 weight parts.

Besides, a hardening catalyst referred to as a reaction hardening accelerator or a polymerization initiator can be added to the binder in the mixture 21. As the hardening catalyst, an organic peroxide or an azo component can be used. For example, ketone peroxide, diacyl peroxide, peroxy-ketal, peroxy ester, hydroperoxide, peroxy carbonate, t-butyl peroxy-2-ethylhexanoate, bis(4-tert-butyl cyclohexyl)peroxy di carbonate, di cumyl peroxide, etc. can be used as an organic peroxide, and azobis(iso-butyro nitrile) can be used as an azo compound.

Embodiment 1

To evaluate the plasma display substrate and the production method thereof in accordance with the present invention, samples of the paste-like mixture 21 were prepared as follows. Alumina ($Al_2O_3$), zirconia ($ZrO_2$), silicon nitride ($Si_3N_4$) and aluminum nitride (AlN) each having an average particle diameter in the range of 0.2 to 5 μm as the main ingredients are mixed with the above-mentioned known sintering aid as necessary to obtain ceramic powder. Binder compositions listed as the samples No. 1 to No. 7 of TABLE 1 are blended with the ceramics powder amounting to 100 weight parts and mixed by a mixer to adjust the viscosity, thereby obtaining the samples of the paste-like mixture 21. The kinds of the binder compositions shown in TABLE 1 are known by the materials described in TABLE 2.

After the completion of thermosetting, the molded partitions made of the mixture and contacted with the rear plate 10 were separated from the mold 20, and the molded partitions on the rear plate 10 were dried at 120° C. for 5 hours, and first maintained in an atmosphere of nitrogen at 250° C. for 3 hours, and then subjected to debinder treatment at 500° C. for 12 hours. After this, the molded partitions containing alumina as the main ingredient were maintained

TABLE 1

| | Binder composition | | | | | | | |
|---|---|---|---|---|---|---|---|---|
| | Ceramic powder | Solvent | | Organic additive | | Other additive | | |
| Sample No. | main ingredient | Kind | Amount of additive wt parts | Kind | Amount of additive wt parts | Kind | Amount of additive wt parts | Remarks |
| 1 | ① | ① | 10 | ② | 15 | Dispersant | 2 | Carbonate |
| 2 | " | ② | " | ① | " | — | — | |
| 3 | " | " | " | ② | " | Dispersant | 2 | Phosphate |
| 4 | " | " | " | " | 20 | " | " | Phosphate |
| 5 | ② | " | " | " | 15 | " | " | Dodecyl-polyethylene glycol |
| 6 | ③ | " | 15 | " | " | — | — | |
| 7 | ④ | " | 10 | " | " | Dispersant | 2 | Dodecyl-polyethylene glycol |
| 8 | ① | ③ | 30 | ③ | " | " | " | Phosphate, comparison example |

TABLE 2

| | Mark | Material |
|---|---|---|
| Ceramic powder main ingredient | ① ② ③ ④ | Alumina Zirconia Silicon nitride Aluminum nitride |
| Solvent | ① ② ③ | Diethyl phthalate Octanol α-terpineol |
| Organic additive | ① ② ③ | Epoxy resin Unsaturated polyester Methyl cellulose |

The prepared mixture 21 was defoamed by a vacuum apparatus, added dropwise to the sides of the cavities 20a of the mold 20 made of silicon resin, and applied and supplied into the cavities 20a in the manner of sheet formation by using the doctor blade method.

The shape of the cavity 20a matches the shape of the partition 11 shown in FIGS. 1a and 1b, and is an inverse trapezoid. The width of the cavity 20a was made smaller in the direction from the rear to the front. The dimensions of the cavity 20a were determined in consideration of shrinkage allowances during firing so that the cell pitch was 220 μm, the width t2 of the root portion of the partition 11 was 110 μm, the thickness t1 of the upper end portion of the partition was 50 μm, the opening width at the upper surface of the cell was 170 μm, the width of the bottom surface of the cell was 50 μm, and the height of the cell (the height of the partition) was 100 μm after sintering.

The defoaming treatment may be performed after the mold 20 is filled with the mixture.

Then, the flat rear plate 10 made of a ceramic sintered body similar to the mixture 21 was placed on the surface of the mixture 21 supplied into the mold 20. The mixture disposed between the rear plate 10 and the mold 20 was accommodated in a heating furnace while a pressure of about 100 g/cm² was applied between the rear plate 10 and the mold 20, and thermoset at 100° C. for 45 minutes.

in atmospheric air at 1600° C. for 2 hours. The molded partitions containing zirconia as the main ingredient were maintained in atmospheric air at 1450° C. for 2 hours. The molded partitions containing silicon nitride as the main ingredient were maintained in an atmosphere of nitrogen at 1650° C. for 10 hours. The molded partitions containing aluminum nitride as the main ingredient were maintained in an atmosphere of nitrogen at 1800° C. for 3 hours. Consequently, the molded partitions were fired and integrally joined to the rear plate, thereby obtaining the plasma display substrate 1 of the present invention.

A comparison example was prepared as described below. Methyl cellulose and α-terpineol were added to and kneaded with the ceramics powder containing alumina as the main ingredient, shown as sample No. 8 in TABLE 1, thereby obtaining printing paste. By using the printing paste, printing was repeated in accordance with the thick film printing method, and a plasma display substrate 1 with the partitions 11 having the same specifications as those of the above-mentioned partitions 11 was obtained as the comparison example.

By using the substrates 1 implemented as the embodiments and the comparison example thus obtained, the surface roughness of the partitions 11 was measured with a contact-type surface roughness meter (SURFRECORDER SE-2300). In addition, to obtain the dimensional accuracy of the partition 11, the lengths of 45 rows of 1000 cells were measured with a micrometer, and the maximum difference in the measured values was obtained for each sample. The surface roughness and the maximum difference are shown in TABLE 3.

TABLE 3

| Sample No. | Surface roughness Rmax μm | Dimensional accuracy (mm) | Shape of display cell | Remarks |
|---|---|---|---|---|
| 1 | 1.2 | ≦0.05 | Proper | " |
| 2 | 1.7 | " | " | |

TABLE 3-continued

| Sample No. | Surface roughness Rmax μm | Dimensional accuracy (mm) | Shape of display cell | Remarks |
|---|---|---|---|---|
| 3 | 1.3 | " | " | |
| 4 | 1.4 | " | " | |
| 5 | 1.7 | " | " | |
| 6 | 1.8 | " | " | |
| 7 | 1.3 | " | " | |
| 8 | 6.7 | 0.35 | Improper | Partially crushed |

As a result, in sample No. 8, that is, the comparison example, having the partitions 11 made by the thick-film printing method, the surface roughness Rmax of the partitions 11 is 6.7 μm, and the maximum difference in the length of 1000 cells, used as a value to evaluate the dimensional accuracy, is 0.35 mm. In samples No. 1 to No. 7 of the embodiments of the present invention, the surface roughness Rmax is 1.8 μm or less, and the maximum difference in the length of 1000 cells is 0.05 mm or less, regardless of the kind of the ceramics powder. It is understood that the embodiments of the present invention are significantly superior. Besides, no deformation was found in the partitions and the display cells of the embodiments.

The present invention is not limited to the embodiments. It is confirmed that the same effects can be obtained by using apatite ($Ca_5(PO_4)_3(F, Cl, OH)$), glass ($Na_2O.CaO.5SiO_2$) or the like as the main ingredient of the ceramics powder.

Furthermore, the shape of the mold 20 used to mold the partitions 11 for defining the display cells in accordance with the present invention was explained in the description of the cavity 20a having an inverse trapezoid shape matching the shape shown in FIGS. 1a and 2a. However, the shape is not limited to that shown in the figures.

Embodiment 2

Next, the partitions 11 were molded by using the mixtures 21 of sample No. 1 and No. 2 in accordance with the embodiment 1 and by using the same mold as that of the embodiment 1, and joined to the rear plate 10. At this time, the mixture 21 for the partitions 11, being in an unfired condition, was joined to the rear plate 10; and the mixture 21 for the partitions 11, being in a fired condition, was joined to the rear plate 10. Furthermore, at this time, three kinds of rear plates 10 were used: an unfired ceramics plate, a fired ceramics plate and a glass plate. In these combinations, the generation of separation and cracking at the time of firing and integration was examined, and the results shown in TABLE 4 were obtained.

TABLE 4

| No. | Molded partition | Kind of rear plate | | |
|---|---|---|---|---|
| | | Unfired ceramics | Fired ceramics | Glass |
| 1 | Unfired | ⊚ | ○ | X |
| | Fired | ⊚ | ⊚ | ⊚ |
| 6 | Unfired | ⊚ | ○ | X |
| | Fired | ⊚ | ⊚ | ⊚ |

⊚: Not separated/cracked
○: Partially separated/cracked
X: Separated/cracked
Glass: a glass composition comprising 70 weight parts of Pb glass and 30 weight parts of alumina According to the results, when the unfired molded partitions made of the mixture 21 containing ceramics powder were joined to the rear plate 10, the molded partitions were cracked because of the difference in temperature during firing. On the other hand, the molded partitions made of the mixture 21 containing ceramics powder, being fired preliminarily, was able to be joined to the glass rear plate without causing separation and cracking.

Embodiment 3

As shown in TABLE 5, as the mixture 21 for the partitions 11, various kinds of slurry were prepared by adding various solvents, various organic additives and some dispersants to glass powder having an average particle diameter of 0.1 to 10 μm (preferably 0.2 to 5 μm). These kinds of the mixtures 21 in slurry form were supplied into the cavities 20a of the mold 20, and subjected to a defoaming treatment.

The glass rear plate 10 was made contact with the surface of the mold 20 on the side of the cavities 20a. Both were subjected to pressure and dried. After confirming that the molded partitions made of the mixture 21 were joined to the rear plate 10, the mold was separated. Then, the whole including the rear plate 10 was fired at 500 to 800° C., thereby obtained the plasma display substrates (sample No. 11 to No. 16).

TABLE 5

| No. | Main ingredient | Binder composition (weight parts) | | | | |
|---|---|---|---|---|---|---|
| | | Solvent | Organic additive | | Other additive | |
| 11 | Glass | Diethyl phthalate | 10 | Unsaturated polyester | 15 | Dispersant 2 |
| 12 | " | Octanol | 10 | Epoxy resin | 15 | — |
| 13 | " | " | 10 | Unsaturated polyester | 15 | Dispersant 2 |
| 14 | " | " | 10 | " | 20 | Dispersant 2 |
| 15 | " | " | 15 | " | 15 | — |
| 16 | " | α-terpineol | 30 | Methyl cellulose | 15 | Dispersant 2 |

Glass: the glass composition described in TABLE 4.

A comparison example was prepared as described below. In accordance with the conventional print lamination method, screen printing and drying were repeated ten times to form the partitions 11 on the glass rear plate 10. The whole including the rear plate 10 was fired at 500 to 800° C., thereby obtained a plasma display substrate as the comparison example (sample No. 17).

Regarding the substrates of the embodiments and the comparison example, the shape of the partitions 11 and the generation of cracking were examined with a binocular microscope, and the results were shown in TABLE 6.

TABLE 6

| No. | Shape of partition | Cracking | Dislocation between partition and electrode |
| --- | --- | --- | --- |
| 11 | Proper | Not cracked | Not dislocated |
| 12 | " | Not cracked | Not dislocated |
| 13 | " | Not cracked | Not dislocated |
| 14 | " | Not cracked | Not dislocated |
| 15 | " | Not cracked | Not dislocated |

In addition, a comparison example was prepared as described below. The partitions 11 were formed by the sandblasting method, thereby preparing a substrate. In other words, after a glass agent to be used as the partitions for the glass rear plate 10 was applied and fired, a resist mask was set, and unnecessary portions were removed by sandblasting, thereby forming the partitions 11 (sample No. 18).

The phosphor 16 was applied to the samples, and the amount of the phosphor and the definition of the partitions 11 were evaluated. The definition was evaluated to be superior as the partition pitch and the partition width are smaller.

As shown in TABLE 7, to obtain higher definition and decrease the amount of the phosphor 16, it is understood that the angle should be in the range of 1 to 45°, preferably in the range of 2 to 40°.

TABLE 7

| | $\theta = 0°$ | | $\theta = 2°$ | | $\theta = 15°$ | | $\theta = 40°$ | | $\theta = 45°$ | |
| --- | --- | --- | --- | --- | --- | --- | --- | --- | --- | --- |
| No. | Amount | Definition | Amount | Definition | Amount | Definition | Amount | Definition | Amount | Definition |
| 11 | X | ○ | Δ | ○ | ○ | ○ | ○ | ○ | ○ | Δ |
| 12 | X | ○ | Δ | ○ | ○ | ○ | ○ | ○ | ○ | Δ |
| 13 | X | ○ | Δ | ○ | ○ | ○ | ○ | ○ | ○ | Δ |
| 14 | X | ○ | Δ | ○ | ○ | ○ | ○ | ○ | ○ | Δ |
| 15 | X | ○ | Δ | ○ | ○ | ○ | ○ | ○ | ○ | Δ |
| 16 | X | ○ | Δ | ○ | ○ | ○ | ○ | ○ | ○ | Δ |
| *17 | X | Δ | — | — | — | — | — | — | — | — |
| *18 | X | Δ | — | — | — | — | — | — | — | — |

Item A designates the usage amount of phosphor.
○: small amount
Δ: medium amount
X: large amount
Item B designates the definition of partition.
○: good
Δ: average
X: poor
*indicates the comparison examples.

TABLE 6-continued

| No. | Shape of partition | Cracking | Dislocation between partition and electrode |
| --- | --- | --- | --- |
| 16 | Partially crushed | Partially cracked | Not dislocated |
| *17 | Indefinite shape | Not cracked | Dislocated |

*indicates the comparison example.

As a result, the partitions 11 made by the method used to obtain the comparison example were indefinite in shape. The partitions 11 made by the method of the present invention were generally proper in shape and free of crack generation, although there was slight crushing. It is therefore understood that proper plasma display substrates can be obtained even when the rear plate 10 and the partitions 11 are made of glass.

Embodiment 4

In the molding conditions for the samples No. 11 to No. 16 given in the description of the embodiment 3, substrates were prepared, which have angle θ between the side surface 11a of each partition 11 and the normal line of the rear plate 10 being set at 0°, 2°, 15°, 40° and 45°. However, substrates having the angle θ set at more than 45° were excluded, since they were improper in consideration of definition. The height of the partition was set at 200 μm, and the thickness t1 of the upper end portion was set at 50 μm.

Embodiment 5

Next, in sample No. 13 of the embodiment 4 with the angle set at 15°, the various chamfered portions 11b shown in FIG. 6 were formed at the upper end portion of the partition 11. The electrode material 12 and the phosphor 16 were applied to the chamfered portions, and the substrates having these chamfered portions were subjected to a light emission test. As a result, the light emission of these substrates was better than that of the substrate having the conventional partitions 11.

Embodiment 6

(A) Ag paste was applied to the flat plate as an electrode material, the molded partitions 20 were pressed against the flat plate coated with the paste, the electrode material 22 was transferred and applied to the convex portions 20b of the mold 20, and then dried directly. Next, glass powder having an average particle diameter of 0.2 to 10 μm (preferably 0.2 to 5 μm) was mixed with a binder inclusive of various solvents, various organic additives and some dispersant to prepare slurry-like mixtures shown in TABLE 6 (samples No. 21 to No. 26) as the mixture 21 for molding the partitions 11. The mixture was supplied into the cavities 20a of the mold 20 and subjected to defoaming.

The glass rear plate 10 was made contact with the surface of the mold 20, and dried under pressure. The mixture 21 and the electrode material 22 were caked. After confirming that the mixture 21 and the electrode material 22 were caked and contacted with the rear plate 10, the mold 20 was separated. And then, the whole of the rear plate 10 was heated and fired at 500 to 700° C. to form the plasma display substrate 1.

TABLE 8

| No. | Main ingre-dient | Binder composition (weight parts) | | | | |
|---|---|---|---|---|---|---|
| | | Solvent | Organic additive | | Other additive | |
| 21 | Glass | Diethyl phthalate | 10 | Unsaturated polyester | 15 | Dispersant 2 |
| 22 | " | Octanol | 10 | Epoxy resin | 15 | — |
| 23 | " | " | 10 | Unsaturated polyester | 15 | Dispersant 2 |
| 24 | " | " | 10 | " | 20 | Dispersant 2 |
| 25 | " | " | 15 | " | 15 | — |
| 26 | " | α-terpineol | 30 | Methyl cellulose | 15 | Dispersant 2 |

Glass: the glass composition described in TABLE 4.

(B) By using the mixtures 21 having the compositions shown in TABLE 9 (samples No. 27 to 32), each of the mixture 21 was supplied so as to cover the electrode plate 22 when the cavities 20a of the mold 20 is filled with the mixture 21. Except this covering condition, the same method in accordance with the item (A) was used to prepare plasma display substrates 1.

Regarding the samples thus obtained (samples No. 21 to 39), the partitions 11 were observed with a binocular microscope to check deformation, cracking and dislocation relative to the electrodes 12. The results were summarized in TABLE 10. According to the results, it was recognized that the shape of the partitions of sample 39 of the comparison example was indefinite, and that dislocation was caused

TABLE 9

| No. | Main ingre-dient | Binder composition (weight parts) | | | | |
|---|---|---|---|---|---|---|
| | | Solvent | Organic additive | | Other additive | |
| 27 | Glass | Diethyl phthalate | 10 | Unsaturated polyester | 15 | Dispersant 2 |
| 28 | " | Octanol | 10 | Epoxy resin | 15 | — |
| 29 | " | " | 10 | Unsaturated polyester | 15 | Dispersant 2 |
| 30 | " | " | 10 | " | 20 | Dispersant 2 |
| 31 | " | " | 15 | " | 15 | — |
| 32 | " | α-terpineol | 30 | Methyl cellulose | 15 | Dispersant 2 |

Glass: the glass composition described in TABLE 4.

(C) As the electrode material 22, W paste was used, and alumina and zirconia having an average particle diameter of 0.2 to 5 μm were used as the mixtures shown in TABLE 10 (samples No. 33 to No. 38). These were fired at 1450 to 1600° C. Except this condition, the same method in accordance with the item (A) was used to prepare plasma display substrates 1.

between the partitions 11 and the electrodes 12. On the other hand, the embodiments (samples No. 21 to No. 38) of the present invention were free of dislocation and the shapes of the partitions were proper. Crushing was recognized in the samples No. 6, No. 12 and No. 18 of the embodiments because of the abundant amount of the solvent.

TABLE 10

| No. | Main ingre-dient | Binder composition (weight parts) | | | | |
|---|---|---|---|---|---|---|
| | | Solvent | Organic additive | | Other additive | |
| 33 | Alumina | Diethyl phthalate | 10 | Unsaturated polyester | 15 | Dispersant 2 |
| 34 | " | Octanol | 10 | Epoxy resin | 15 | — |
| 35 | Zirconia | " | 10 | Unsaturated polyester | 15 | Dispersant 2 |
| 36 | Alumina | " | 10 | " | 20 | Dispersant 2 |
| 37 | Zirconia | " | 15 | " | 15 | — |
| 38 | Alumina | α-terpineol | 30 | Methyl cellulose | 15 | Dispersant 2 |

On the other hand, a comparison example was prepared as described below. The electrode 12 was formed on the glass rear plate 10 by the screen printing in accordance with the conventional printing method. The printing and drying of the partitions 11 disposed between every two adjacent electrodes were repeated ten times. The partitions and the electrodes were then fired at 500 to 700° C. to prepare a plasma display substrate 1 (sample No. 39).

TABLE 11

| No. | Shape of partition | Cracking | Dislocation between partition and electrode |
|---|---|---|---|
| 21 | Proper | Not cracked | Not dislocated |
| 22 | " | Not cracked | Not dislocated |
| 23 | " | Not cracked | Not dislocated |

TABLE 11-continued

| No. | Shape of partition | Cracking | Dislocation between partition and electrode |
|---|---|---|---|
| 24 | " | Not cracked | Not dislocated |
| 25 | " | Not cracked | Not dislocated |
| 26 | Partially crushed | Partially cracked | Not dislocated |
| 27 | Proper | Not cracked | Not dislocated |
| 28 | " | Not cracked | Not dislocated |
| 29 | " | Not cracked | Not dislocated |
| 30 | " | Not cracked | Not dislocated |
| 31 | " | Not cracked | Not dislocated |
| 32 | Partially crushed | Partially cracked | Not dislocated |
| 33 | Proper | Not cracked | Not dislocated |
| 34 | " | Not cracked | Not dislocated |
| 35 | " | Not cracked | Not dislocated |
| 36 | " | Not cracked | Not dislocated |
| 37 | " | Not cracked | Not dislocated |
| 38 | Partially crushed | Partially cracked | Not dislocated |
| *39 | Indefinite shape | Not cracked | Dislocated |

*indicates the comparison example.

Furthermore, although the rear plate 10 made of glass was used for the embodiments, even when the rear plate 10 was made of various ceramics, such as alumina, the same effects were obtained.

Embodiment 7

A binder inclusive of solvents and organic additives, organic silicate compounds, a dispersant and a polymerization accelerator were weighed so as to obtain the mixture compositions shown in TABLE 12 and then mixed with the ceramic or glass powder having an average particle diameter of 1.5 μm and amounting to 100 weight parts in a bowl mill, thereby obtaining slurry for forming. Slurry excluding organic silicate compounds was used as a comparison example.

The materials for the mixtures shown in TABLE 12 are listed in TABLE 13.

TABLE 13

| Classification | Mark | Kind of mixture Material (weight parts) |
|---|---|---|
| Material powder main ingredient | ① | Soda-lime glass |
| | ② | Alumina |
| | ③ | Zirconia |
| Binder with organic additive | ① | Divinyl ether ethyl (70) + phthalate (30) |
| | ② | Divinyl ether ethyl (30) + phthalate (70) |
| | ③ | Polyethylene glycol diacrylate (50) + phthalate (50) |
| | ④ | Methyl cellulose (20) + α-terpineol (50) + phthalate (30) |
| | ⑤ | Butyral polyvinyl alcohol (10) + toluene (45) + methanol (45) |
| Organic silicate compound | ① | Polymethoxy dimethyl silane |
| | ② | Vinyl triethoxy silane |
| | ③ | γ methacrythoxy propyl methoxy silane |
| Dispersant | ① | Dodecyl-benzene sulfonic acid ammonium salt |
| | ② | Nonyl polyethylene glycol |

After the obtained slurry for forming was subjected to vacuum defoaming, the slurry was poured and supplied into a mold made of silicon rubber provided with 500 groove-shaped cavities measuring 50 m in width, 300 mm in length and 10 to 350 μm variable in depth at a pitch of 0.3 mm. The mold was contacted with the glass flat plate under pressure before hardening, and heated at 80° C. and maintained at the temperature to cure the slurry. Then the molded partitions closely contacting the flat glass plate were separated from the mold to obtain the molded partitions to be used for an evaluation test.

At this time, ribs similar to the partitions obtained as the molded partitions were observed with a magnifying glass.

TABLE 12

| | Material powder main ingre- | Binder | | Organic silicate compound | | Dispersant | | |
|---|---|---|---|---|---|---|---|---|
| Sample No. | dient | Kind | Amount of additive | Kind | Amount of additive | Kind | Amount of additive | Remarks |
| ≠ 41 | ① | ① | 46 | ① | 4 | ① | 0.5 | |
| 42 | " | " | 45 | " | 5 | " | " | |
| 43 | " | " | 40 | " | 10 | " | " | |
| 44 | " | " | 10 | " | 40 | " | " | |
| 45 | " | " | " | " | 60 | " | " | |
| ≠ 46 | " | " | " | " | 70 | " | " | |
| 47 | " | ② | 17 | " | 50 | " | " | |
| 48 | " | " | 20 | " | 40 | " | " | |
| 49 | " | " | 30 | " | 30 | " | " | |
| 50 | " | ① | 25 | " | 20 | " | " | |
| 51 | " | " | 30 | " | 10 | " | " | |
| 52 | ② | " | 20 | " | 50 | " | " | |
| 53 | ③ | ③ | " | " | " | " | " | |
| ≠ 54 | ① | ① | 50 | — | — | " | " | Comparison example |

≠ Solvent: octanol 10 wt parts, polymerization accelerator: PERKADOX (trade name) 0.05 wt parts The yield of the molded partitions was calculated on the basis of the number of cracked and deformed ribs from among 500 ribs. Furthermore, the strength of the molded-partitions measured before firing was 20 kg/cm² or more in all the molded partitions of the embodiments, although the strength of the molded partitions of the comparison example was 5 kg/cm² or less.

Next, after the molded partitions were maintained at a predetermined temperature to perform debinder treatment, the firing atmosphere was changed appropriately depending on the main ingredient of the material powder, and the molded partitions were fired and integrated at a predetermined temperature.

By using the evaluation samples obtained after firing, the ribs similar to the partitions were checked for deformation and cracking with a stereomicroscope to evaluate the shapes of the partitions. In addition, the contraction coefficient was evaluated by calculating a linear contraction coefficient on the basis of the height values of the ribs before and after the firing of the samples.

Next, on the holder made of a convex alumina sintered body having a radius of curvature of 10 m, the rear plate side of the substrate was placed and heated at 500° C. for 3 hours to obtain substrates for an evaluation test.

The radius of curvature of the rear plate of the curved substrate was measured with a three-dimensional coordinate measuring instrument, and it was confirmed that the radius of curvature was the same as that of the holder.

In addition, a flat substrate was also prepared by using a holder having the same conditions as those of the above-mentioned holder except that the upper surface was flat.

By using the curved substrate and the flat substrate, paste inclusive of soda-lime glass powder for joining and having a melting point of 450° C. was applied to the upper end portions of the partitions of the substrates and dried. These substrates were individually aligned and contacted with soda-glass front plates measuring 2 mm in thickness, 270 mm in depth and 280 mm in length, and secured with jigs at

TABLE 14

| Sample No. | Yield of molded partition (%) | Shape of partition Deformation | Cracking | Contraction coefficient (%) | Remarks |
|---|---|---|---|---|---|
| 41 | 98 | Deformed | Not cracked | 75 | |
| 42 | 100 | Not deformed | " | 73 | |
| 43 | " | " | " | 75 | |
| 44 | " | " | " | 84 | |
| 45 | " | " | " | 78 | |
| 46 | 98 | " | Cracked | 71 | |
| 47 | 100 | " | Not cracked | 92 | |
| 48 | " | " | " | 72 | |
| 49 | " | " | " | " | |
| 50 | " | " | " | 73 | |
| 51 | " | " | " | 75 | |
| 52 | " | " | " | 68 | |
| 53 | " | " | " | 69 | |
| 54 | 98 | Deformed | " | 68 | Comparison example |

The results were summarized in TABLE 14. It was found that the samples added with organic silicate compounds were effective in preventing the partitions from being deformed or cracked, regardless of the material of the partitions.

Embodiment 8

First, soda lime glass was pulverized to obtain glass powder having an average particle diameter of 2 μm. α-terpineol amounting to 60 weight parts as a solvent, nitrified cellulose amounting to 5 weight parts as an organic additive, nonionic dispersant amounting to 1 weight part as a dispersant and demethanol polymer of trimethoxy silane amounting to 20 weight parts were added to the glass powder amounting to 100 weight parts and mixed in a bowl mill to obtain paste-like slurry for forming.

After the obtained slurry for molding was subjected to vacuum defoaming, the slurry was poured and supplied into a mold made of silicon rubber (measuring 300 mm in depth and 250 mm in length) provided with 500 groove-shaped cavities measuring 50 μm in width, 300 mm in length and 10 to 350 μm variable in depth at a pitch of 0.3 mm. The mold was contacted with the surface of the flat rear plate made of glass and having the same dimensions as those of the mold under pressure before curing, and heated at 80° C. and maintained at the temperature to cure the slurry. Then the forming bodies closely contacting the flat glass plate were separated from the mold to obtain substrates for an evaluation test.

the peripheral portions of the substrates at a pressure of about 200 g/cm², and heated at 450° C. for 10 minutes. The front plates were joined to the substrates to obtain samples to be evaluated.

In this way, 100 sheets of the evaluation samples were made. These were subjected to visual inspection to check the contact condition of the junction glass, more specifically, to check for protrusion of junction glass, excessive or insufficient amount of junction glass and the presence or absence of gaps due to noncontact at the upper end portions of the partitions. As a result, when a flat substrate was used, the junction glass protruded partially. Noncontact portions were found in 32 sheets, and the total length of the noncontact partitions amounted to 15 mm.

On the other hand, in the samples of the curved substrates, no protrusion of junction glass was found and no improper junction to the partitions was recognized. It was therefore confirmed that the partitions were able to be isolated from one another completely.

As described above, in the plasma display substrate and the production method thereof in accordance with the present invention, the mold is filled with the mixture of ceramic or glass powder and the binder so as to obtain the molded partitions, the partitions are arranged on the rear plate made of ceramics or glass and joined to the rear plate. Therefore, the forming process is made simple, and the dimensional accuracy of the mold are reflected to the dimensional accuracy of the molded partitions, whereby the partitions having proper surface conditions can be obtained and a large-screen display device having high accuracy in the arrangement and shape of the cells can be achieved easily. Consequently, the production process can be simplified, the yield of products can be enhanced, and plasma display substrates having high definition can be obtained.

In addition, by making the width of the cell formed between every two adjacent partitions larger in the direction for the rear plate side to the front, the light emission area can be made larger, the light emission intensity can be increased, and the amount of phosphor to be applied can be decreased.

Furthermore, since the electrode is formed on the rear plate over the entire bottom surface of the cell formed between every two adjacent partitions, the discharge area can be made larger, and the light emission efficiency can be increased. The electrode material is applied to the convex portions of the mold, the cavities of the mold are filled with the mixture for the partitions, and the electrodes and the formed partitions are transferred to the rear plate together, and integrated. Therefore, there is no dislocation between the electrodes and the partitions, and precise and accurate partitions can be formed easily, thereby simplifying the production process and reducing production costs.

Moreover, by adding organic silicate compounds to the mixture of ceramic or glass powder and the binder, the deformation and shrinkage in the firing process can be reduced. In addition, by reaction hardening, the minute shape of the cavities of the mold is faithfully copied to the molded partitions, and the surface conditions of the partitions obtained by firing the molded partitions are maintained properly at the dimensional accuracy of the mold, thereby obtaining a substrate having high-definition display cells.

By setting the rear plate of the substrate to have a convex shape curved toward the partition side, when the partitions are made contact with the front plate, the contact between the upper end portions of the partitions on the rear plate and the front plate is made perfect, and the discharge display cells can be completely isolated from one another. Consequently, when the substrate is used for a display panel, the joining area of the front plate to the partitions is made minimum, and the opening area of the pixel can be obtained sufficiently, thereby making it possible to offer uniform and high-quality images. Besides, since the curved substrate can be obtained easily during the production process or independently, thin, large-screen substrates and display devices can be produced easily at low costs.

We claim:

1. A plasma display substrate formed using a partition mold, the plasma display substrate comprising:
   a rear plate having a surface, the rear plate made of at least one of ceramics and glass; and
   a plurality of partitions joined integrally to the surface of the rear plate, the plurality of partitions forming display cells between every two adjacent partitions on the surfaces of the rear plate, wherein the plurality of partitions are molded using the partition mold with the mixture of ceramic or glass powder and a binder inclusive of organic additives and solvents, and wherein the plurality of partitions are debindered and joined with the rear plate.

2. A plasma display substrate according to claim 1, wherein the maximum difference of measured values obtained by measuring the lengths of 45 rows of 1000 display cells, each of said cells being formed between every two of said partitions, is about 0.05 mm or less.

3. A plasma display substrate according to claim 1, wherein the rear plate is laterally convexly curved to have a predetermined curvature radius.

4. A plasma display substrate according to claim 3, wherein the predetermined curvature radius is between 5 to 15 m.

5. A plasma display substrate formed using a partition mold, the plasma display substrate comprising:
   a rear plate having a surface, the rear plate made of at least one of ceramics and glass; and
   a plurality of partitions joined integrally to the surface of the rear plate, the plurality of partitions forming display cells between every two adjacent partitions on the surfaces of the rear plate, wherein the plurality of partitions are molded using the partition mold with the mixture of ceramic or glass powder and a binder inclusive of organic additives and solvents, and wherein the plurality of partitions are debindered and joined with the rear plate, wherein the width of the cell formed between every two adjacent partitions is made larger from the rear plate to the front.

6. A plasma display substrate according to claim 1 or 5, wherein an electrode is disposed on the entire bottom surface of the display cell formed between every two of said partitions.

7. A plasma display substrate according to claim 1 or 5, wherein the plurality of partitions are laterally convexly curved.

8. A plasma display substrate claim 1 or 5, further comprising a front plate joined to the upper end portions of said partitions.

9. A plasma display substrate according to claim 5, wherein the angle between the side surface of the display cell and the normal line of the rear plate is in the range of 1 to 45°.

10. A plasma display substrate according to claim 5 or 9, wherein chamfered portions are formed on the upper end portions of said partitions.

11. A plasma display substrate of claim 5, wherein side walls of the partitions includes a plurality of steps.

12. A plasma display substrate according to claim 5, wherein the rear plate is laterally convexly curved to have a predetermined curvature radius.

13. A plasma display substrate according to claim 12, wherein the predetermined curvature radius is between 5 to 15 m.

* * * * *